Patented July 18, 1950

2,515,938

UNITED STATES PATENT OFFICE 2,515,938

PHOTOSENSITIVE COPPER GLASS AND METHOD OF MAKING IT

Stanley Donald Stookey, Corning, N. Y., assignor to Corning Glass Works, Corning, N. Y., a corporation of New York No Drawing. Application December 8, 1943, Serial No. 513,444

4 Claims. (Cl. 49—92)

This invention relates to photosensitive glasses, that is, glasses in which exposure to short wave radiations such as ultraviolet brings about a change in the glass as a result of which irradiated areas are capable of heat-developed coloration while non-irradiated areas remain substantially unchanged on heating. In Patent 2,326,012 which was issued August 3, 1943, to Robert H. Dalton and assigned to the assignee of the present application, there are disclosed reduced copper-containing glasses which are photosensitive.

According to the patent when a glass containing $Cu_2O$ and melted reducingly is irradiated with short waves such as ultraviolet, X-rays, radioactive radiations, etc., the heat-developed coloration produced by "warming in" will thereafter occur at a lower temperature and/or in a shorter time than it otherwise would. If the composition of the glass is such that it would not readily "warm in," that is, if the $Cu_2O$ content is between about 0.05% and 1% depending, as pointed out in the Dalton patent, on the thinness of the glass article being treated, such irradiation will cause the irradiated parts to develop color on heating while unexposed parts will remain uncolored. By suitably masking selected portions of the glass or protecting them against irradiation as by interposing a photographic negative between the glass and the source of the effective radiations, images and designs can be formed in the glass. The presence of tin oxide in the glass is desirable for the heat development of a red coloration in the irradiated parts.

The primary object of this invention is to increase the photosensitivity of the above described glasses.

Another object is to improve the contrast and detail of images and designs formed in copper containing photosensitive glasses by selective irradiation.

I have discovered that the above and other objects may be accomplished by including a small amount of cerium oxide in the prior copper containing photosensitive glasses. Amounts as small as about 0.05% $CeO_2$ on the oxide basis introduced into the batch are sufficient to produce such effects. Larger amounts cause absorption of the effective radiations and decrease or inhibit photosensitivity.

I have also found that substantial amounts of ultraviolet absorbing substances such as oxides of iron, lead, uranium, vanadium, etc., when present in the glass, also inhibit photosensitivity, or at least prevent penetration of the effective radiations to a substantial depth within the glass. Hence such substances should preferably be absent from my new glasses.

As examples illustrating glass compositions suitable for use according to my invention, the following batches, in parts by weight, are given:

|  | 1 | 2 | 3 |
|---|---|---|---|
| Sand | 330 | 330 | 330 |
| Sodium carbonate | 139 | 139 | 139 |
| Hydrated alumina | 10.5 | 10.5 | 10.5 |
| Calcium carbonate | 70 | 70 | 70 |
| Copper oxide | 0.5 | 0.5 | 0.5 |
| Stannic oxide |  | 1.2 | 1.2 |
| Cerium dioxide | 0.2 | 0.2 | 0.2 |
| Sugar | 1 to 3 | 1 to 3 |  |
| Ammonium chloride |  |  | 8 to 9 |

As a reducing agent, sugar is used in batches 1 and 2 and ammonium chloride is used in batch 3. Ammonium chloride acts as a very mild reducing agent in copper containing photosensitive glasses and is useful because it permits a very accurate reduction of such glasses to the optimum photosensitivity. The exact amount of reducing agent required in all cases cannot be stated because it will depend upon the size and type of melting container and other factors. However, the proper amount of reducing agent for any given conditions can be readily determined by trial, and the above examples are suitable for melting in closed pots of 800 pounds capacity.

It is to be understood that photosensitivity, as used herein, excludes the so-called solarization effect which has long been recognized as common to glasses containing manganese, iron or other polyvalent metals. The discoloration of glass caused by solarization is not permanent but is destroyed by heating the glass. The photosensitivity of glasses of the present invention is distinguished from solarization in that the coloration of the photosensitive glass is developed by heating at temperatures below the softening point of the glass and cannot be destroyed by such heating. The term "reduced silicate glass," as used in the claims, means a glass prepared by fusion of raw glassmaking materials under reducing conditions, containing on the oxide basis a major proportion of silica and a minor proportion of an alkali metal oxide such as sodium oxide, containing minor proportions of other conventional glass-forming oxides such as calcium oxide and alumina, but being free of constituents which inhibit photosensitivity including compounds of iron, lead, uranium, and vanadium.

I claim:

1. A photosensitive glass consisting essentially of a reduced silicate glass containing on the oxide basis by weight 0.05% to 1% of copper computed as $Cu_2O$ and $CeO_2$ in an amount up to 0.05%.

2. An article comprising a body made of a photosensitive glass consisting essentially of a reduced silicate glass containing on the oxide basis by weight 0.05% to 1% of copper computed as $Cu_2O$ and $CeO_2$ in an amount up to 0.05%, selected portions of said body being colored by the copper to form within its mass a heat-stable image exhibiting photographic detail.

3. An article comprising a body of irradiated, substantially colorless photosensitive glass consisting essentially of a reduced silicate glass containing on the oxide basis by weight 0.05% to 1% of copper computed as $Cu_2O$ and $CeO_2$ in an amount up to 0.05%, said body containing within its mass a predetermined latent photographic image capable of being developed, by uniform heating of the entire glass body, into a visible, colored image exhibiting photographic detail.

4. The method of making a glass article which comprises forming an article of a substantially colorless photosensitive glass consisting essentially of a reduced silicate glass containing on the oxide basis by weight 0.05% to 1% of copper computed as $Cu_2O$ and $CeO_2$ in an amount up to 0.05%, exposing an area of the article to shortwave radiations and thereafter heating the article uniformly for a time and at a temperature sufficient to develop color in the exposed area.

STANLEY DONALD STOOKEY.

REFERENCES CITED

The following references are of record in the file of this patent:

UNITED STATES PATENTS

| Number | Name | Date |
|---|---|---|
| 270,991 | Sindell | Jan. 23, 1883 |
| 332,294 | Shirley | Dec. 15, 1885 |
| 337,170 | Libbey | Mar. 2, 1886 |
| 343,823 | Libbey | June 15, 1886 |
| 366,364 | Atterbury | July 12, 1887 |
| 851,317 | Reinmann | Apr. 23, 1907 |
| 1,169,571 | Rosenthal | Jan. 25, 1916 |
| 1,475,573 | Drescher | Nov. 27, 1923 |
| 1,482,389 | D'Adrian | Feb. 5, 1924 |
| 1,771,435 | Gelstharp | July 29, 1930 |
| 1,899,230 | Crowell | Feb. 28, 1933 |
| 2,049,765 | Fischer | Aug. 4, 1936 |
| 2,068,801 | Hood | Jan. 26, 1937 |
| 2,241,950 | Huniger et al. | May 13, 1941 |
| 2,306,626 | Huniger et al. | Dec. 29, 1942 |
| 2,326,012 | Dalton | Aug. 3, 1943 |
| 2,422,472 | Dalton | June 17, 1947 |

OTHER REFERENCES

Gregory, Uses and Applications of Chemical Related Materials, vol. II, page 19.